US008755911B2

(12) United States Patent
Baaijens

(10) Patent No.: US 8,755,911 B2
(45) Date of Patent: Jun. 17, 2014

(54) DEVICE FOR GENERATING LIGHT WITH A VARIABLE COLOR

(75) Inventor: Johannes Petrus Wilhelmus Baaijens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 266 days.

(21) Appl. No.: 12/919,226

(22) PCT Filed: Mar. 2, 2009

(86) PCT No.: PCT/IB2009/050822
§ 371 (c)(1),
(2), (4) Date: Aug. 25, 2010

(87) PCT Pub. No.: WO2009/109890
PCT Pub. Date: Sep. 11, 2009

(65) Prior Publication Data

US 2011/0006707 A1 Jan. 13, 2011

(30) Foreign Application Priority Data

Mar. 6, 2008 (EP) .................................... 08152391

(51) Int. Cl.
*G05B 11/01* (2006.01)
*H05B 37/02* (2006.01)

(52) U.S. Cl.
USPC .............................................. 700/11; 315/307

(58) Field of Classification Search
None
See application file for complete search history.

(56) References Cited

U.S. PATENT DOCUMENTS

| | | | | |
|---|---|---|---|---|
| 5,311,212 | A | 5/1994 | Beretta | |
| 2006/0098077 | A1* | 5/2006 | Dowling | 347/130 |
| 2006/0158881 | A1* | 7/2006 | Dowling | 362/231 |
| 2008/0129750 | A1* | 6/2008 | Voliter et al. | 345/593 |
| 2008/0224024 | A1* | 9/2008 | Ashdown | 250/205 |

FOREIGN PATENT DOCUMENTS

| | | | |
|---|---|---|---|
| EP | 1619934 | A1 | 1/2006 |
| FR | 2838373 | A | 10/2003 |
| JP | 06076958 | A | 3/1994 |
| JP | 2002216978 | A | 8/2002 |
| JP | 2002314825 | A | 10/2002 |
| WO | 2007033667 | A1 | 3/2007 |
| WO | 2007083250 | A1 | 7/2007 |

OTHER PUBLICATIONS

Laszlo Neuman, Antal Nemscics, Attila Neumann, "Quantitative Color Harmony Rules Based on Corloroid Lightness and Saturation Definition", International Conference on Colour Harmony, Budapest, Hungary, Apr. 24-26, 2007, pp. 1-6.*

(Continued)

*Primary Examiner* — Kakali Chaki
*Assistant Examiner* — Walter Hanchak
(74) *Attorney, Agent, or Firm* — Yuliya Mathis

(57) ABSTRACT

An illumination system (10) comprises: a lamp assembly (14) for generating color-variable light (17); a controller (15) for generating control signals (ξ1, ξ2, ξ3) for the lamp assembly; —source color input means (20), preferably a color sensor, for inputting to the controller information defining a source color; a memory (30) associated with the controller, containing information defining at least one color harmony rule. On the basis of the input source color, and using the harmony rule from the memory, the controller calculates a target color and generates its output control signals accordingly. Thus, the light output from the lamp assembly harmoniously matches the measured color of surroundings or objects.

9 Claims, 2 Drawing Sheets

(56) References Cited

OTHER PUBLICATIONS

Obrador, P.: "Automatic Color Scheme Picker for Document Templates Based on Image Analysis and Dual Problem"; 2006 SPIE Conference on Digital Publishing, 11 Page Document, Downloaded From http://www.hpl/hp/com/techreports/2006/HPL-2006-10.pdf.

"Color Harmonies"; 69 Page Article on Theories of Color Harmony, Down Loaded From http://www.handprint.com/HP/WCL/tech13.html, on Oct. 17, 2007.

Trussell et al: "Sampling and Processing of Color Signals"; IEEE Transctons on Image Processing, vol. 5, No. 4, Apr. 1996, PP. pp. 677-681.

Tsukada et al: "Color Matching Algorithm Based on Computational 'Color Constancy' Theory"; ICIP Proceedings, 1999, IEEE, vol. 3, Oct. 1999, pp. 60-64.

* cited by examiner

DEVICE FOR GENERATING LIGHT WITH A VARIABLE COLOR

FIELD OF THE INVENTION

The present invention relates in general to the field of lighting. More particularly, the present invention relates to an illumination device for generating light with a variable color.

BACKGROUND OF THE INVENTION

Illumination systems for illuminating a space with a variable color are generally known. Generally, such systems comprise a plurality of light sources, each light source emitting light with a specific color, the respective colors of the different light sources being mutually different. The overall light generated by the system as a whole is then a mixture of the light emitted by the several light sources. By changing the relative intensities of the different light sources, the color of the overall light mixture can be changed.

It is noted that the light sources can be of different type, such as for instance TL lamp, halogen lamp, LED, etc. In the following, simply the word "lamp" will be used, but this is not intended to exclude LEDs.

By way of an example, in the case of homes, shops, restaurants, hotels, schools, hospitals, etc., it may be desirable to be able to change or set the color of the lighting in harmony with the color of a background such as drapings or carpets or of nearby interior objects such as furniture. A good match can create an attractive atmosphere. However, for an untrained user it may be difficult to create an attractive atmosphere by setting harmonious colors.

SUMMARY OF THE INVENTION

The present invention aims to overcome or at least reduce these problems. More particularly, the present invention aims to provide a lighting system facilitating a user to create an attractive atmosphere by setting harmonious colors.

According to an important aspect of the present invention, an illumination device comprises at least one color-variable luminaire, i.e. a luminaire capable of providing light with color mixing, for instance RGB, RGBA, etc).

According to an important aspect of the present invention, the illumination device further comprises a color sensor, capable of providing a signal that represents the color of a background or adjacent objects.

According to an important aspect of the present invention, the illumination device further comprises a controller capable of receiving the sensor measuring signal and capable of controlling the luminaire on the basis of the received sensor measuring signal. The sensor may be separate from the controller, communicating to the controller through a wired or wireless connection, or the sensor may be integrated in the controller.

According to an important aspect of the present invention, the controller comprises a memory with rules defining harmony rules between colors, and the controller operates, on the basis of the received sensor measuring signal, to select or calculate a color based on the information present in the memory, and to control the luminaire on the basis of the selected color.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
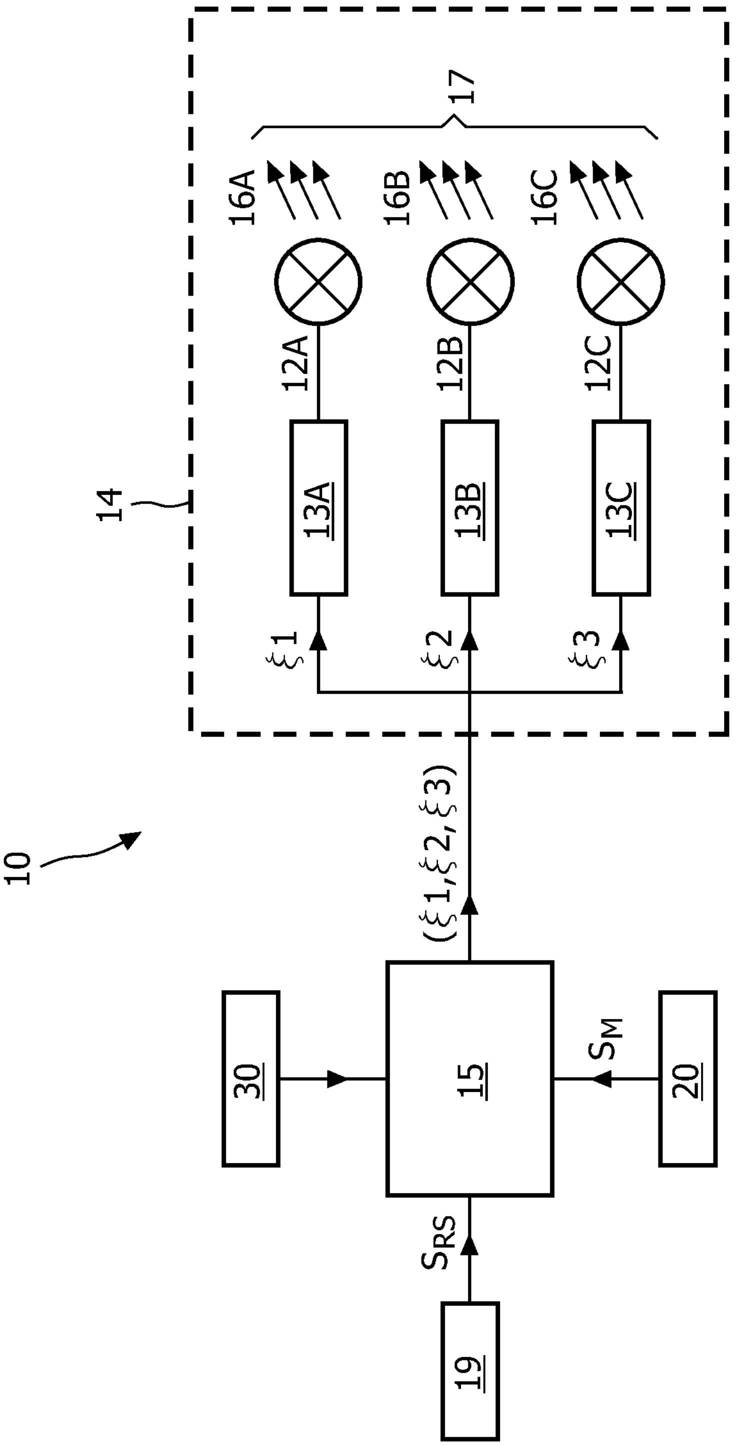
FIG. 1 schematically shows a block diagram of an illumination system according to the present invention.

FIG. 1 schematically shows a block diagram of an illumination system 10, comprising a color-rendering lamp assembly 14. With the phrase "color-rendering" is meant that the lamp assembly is capable of producing light having a variable color, and, when receiving suitable control signals, the lamp assembly is capable of rendering a desired color. In a possible embodiment, as shown, the lamp assembly 14 comprises a plurality (here: three) of lamps 12A, 12B, 12C, for instance LEDs, each with an associated lamp driver 13A, 13B, 13C, respectively, controlled by a common controller 15. The three lamps 12A, 12B, 12C generate light 16A, 16B, 16C, respectively, with mutually different light colors; typical colors used are red (R), green (G), blue (B). Instead of pure red, green and blue, the lamps will typically emit light close-to-red, close-to-green and close-to-blue. The overall light emitted by the lamp assembly 14 is indicated at 17; this overall light 17, which is a mixture of individual lights 16A, 16B, 16C, has a color determined by the mutual light intensities LI(R), LI(G), LI(B) of the primary lamps 12A, 12B, 12C, which in turn are determined by control signals ξ1, ξ2, ξ3 generated by the controller 15 for the respective drivers 13A, 13B, 13C. The respective intensities LI(R), LI(G), LI(B) can be considered as three-dimensional coordinates in an RGB-color space.

It is noted that illumination systems may have four or more lamps. As a fourth lamp, a white lamp may be used. It is also possible that one or more additional colors are used, for instance a yellow lamp, a cyan lamp, etc. In the following explanation, an RGB system will be assumed, but the invention can also be applied to systems with four or even more colors.

For each lamp, the light intensity can be represented as a number from 0 (no light) to 1 (maximum intensity). A color point can be represented by three-dimensional coordinates (ξ1, ξ2, ξ3), each coordinate in a range from 0 to 1 corresponding in a linear manner to the relative intensity of one of the lamps. The color points of the individual lamps can be represented as (1,0,0), (0,1,0), (0,0,1), respectively.

In this respect it is noted that it is customary to operate a LED with a selected fixed lamp current, that is switched ON and OFF at a predetermined switching frequency, so that the duty cycle (i.e. the ratio between ON time and switching period) determines the average lamp power.

In theory, the color space can be considered as being a continuum. In practice, however, a controller of an illumination system is a digital controller, capable of generating discrete control signals only, so that the total number of potentially possible colors is limited.

It is noted that different representations of the color space have also been proposed, such as the CIELAB color space, where the independent variables are hue (H), saturation (S; in CIELAB calculated with S=Chroma/Lightness), brightness (B; in CIELAB calculated from Lightness).

Figure 2:
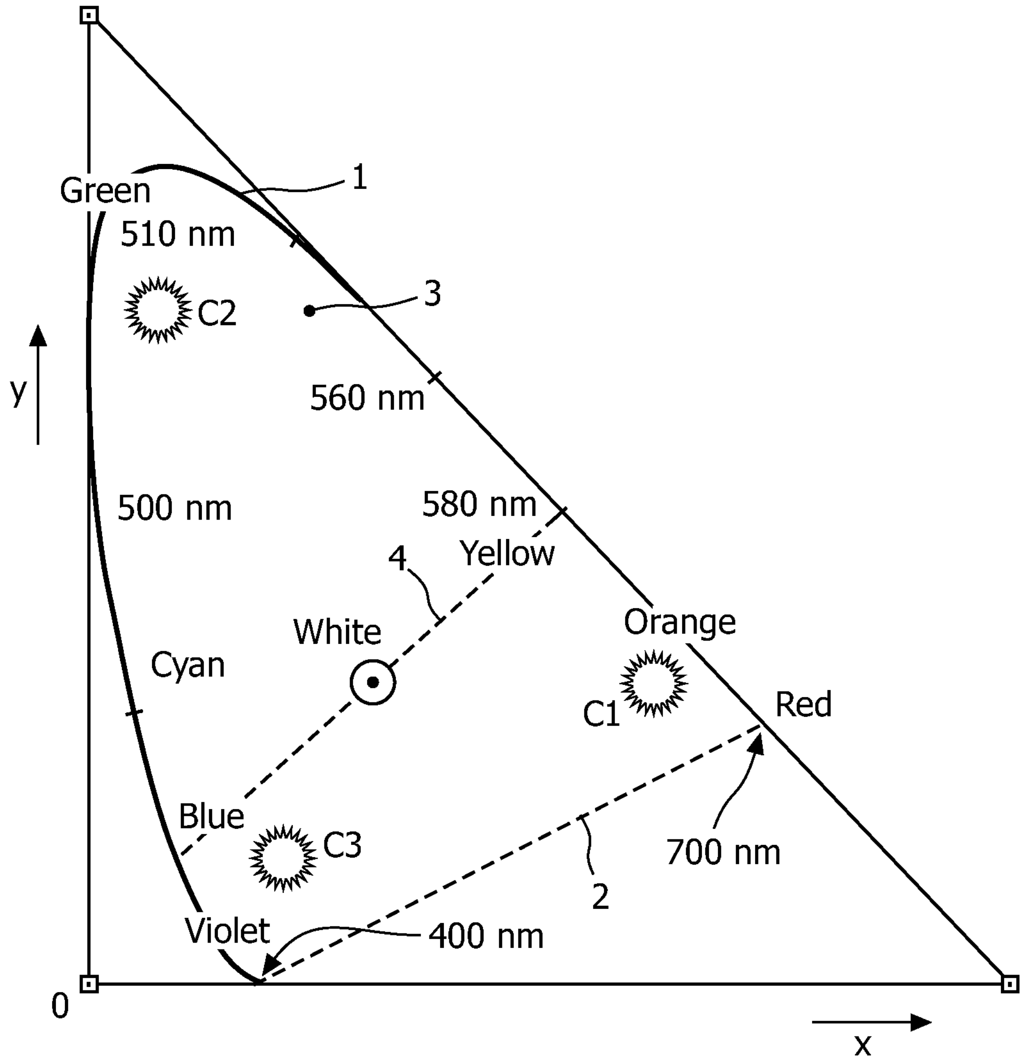
FIG. 2 schematically shows a chromaticity diagram.

The basic concepts of Hue, Saturation and Brightness are most easily explained in the CIE 1931 (x,y) color space, referring to FIG. 2, although in other color spaces other definitions can be obtained. For simplicity, the CIE 1931 (x,y) color space will be used in the following, having coordinates x, y, Y, wherein x and y are chromaticity coordinates and wherein capital Y indicates brightness as an independent coordinate. A transformation from three color coordinates to the x,y coordinates is defined by the following formulas:

$$x = \frac{X}{X+Y+Z} \tag{1a}$$

$$y = \frac{Y}{X+Y+Z} \tag{1b}$$

$$z = \frac{Z}{X+Y+Z} = 1-x-y \tag{1c}$$

in which capitals X, Y and Z represent the tristimulus values that can be calculated from R, G, B values, as should be known to persons skilled in this art. Thus, all colors can be represented in a two-dimensional xy-plane, as shown in FIG. 2, which schematically shows a CIE(xy) chromaticity diagram. This diagram is well-known, therefore an explanation will be kept to a minimum. Points (1,0), (0,0), and (0,1) indicate ideal red, blue and green, respectively, which are virtual colors. These points describe a triangle in the CIE 1931 (x,y) color space. The curved line 1 represents the pure spectral colors. Wavelengths are indicated in nanometers (nm). A dashed line 2 connects the ends of the curved line 1. The area 3 enclosed by the curved line 1 and dashed line 2 contains all visible colors, i.e. colors perceivable by the human eye; in contrast to the pure spectral colors of the curved line 1, the colors of the area 3 are mixed colors, which can be obtained by mixing two or more pure spectral colors. Conversely, each visible color can be represented by coordinates in the chromaticity diagram; a point in the chromaticity diagram will be indicated as a “color point”.

All colors within said triangle can be generated by mixing said ideal colors, as will be explained in the following. When two pure spectral colors are mixed, the color point of the resulting mixed color is located on a line connecting the color points of the two pure colors, the exact location of the resulting color point depending on the mixing ratio (intensity ratio). For instance, when violet and red are mixed, the color point of the resulting mixed color purple is located on the dashed line 2. Two colors are called “complementary colors” if they can mix to produce white light. For instance, FIG. 2 shows a line 4 connecting blue (480 nm) and yellow (580 nm), which line crosses a white point, indicating that a correct intensity ratio of blue light and yellow light will be perceived as white light. The same would apply for any other set of complementary colors: in the case of the corresponding correct intensity ratio, the light mixture will be perceived as white light. It is noted that the light mixture actually still contains two spectral contributions at different wavelengths.

If the light intensity of two complementary colors (lamps) is indicated as I1 and I2, respectively, the overall intensity Itot of the mixed light will be defined by I1+I2, while the resulting color will be defined by the ratio I1/I2. For instance, assume that the first color is blue at intensity I1 and the second color is yellow at intensity I2. If I2=0, the resulting color is pure blue, and the resulting color point is located on the curved line 1. If I2 is increased, the color point travels the line 4 towards a white point. As long as the color point is located between pure blue and white, the corresponding color is still perceived as blue-ish, but closer to the white point the resulting color would be paler.

In the following, the word “color” will be used for the actual color in the area 3, in association with the phrase “color point”. The “impression” of a color will be indicated by the word “hue”; in the above example, the hue would be blue. It is noted that the hue is associated with the spectral colors of the curved line 1; for each color point, the corresponding hue can be found by projecting this color point onto the curved line 1 along a line crossing the white point.

Further, the fact whether a color is a more or less pale hue will be expressed by the phrase “saturation”. If a color point is located on the curve 1, the corresponding color is a pure spectral color, also indicated as a fully saturated hue (saturation=1). As the color point travels towards the white point, the saturation decreases (less saturated hue or paler hue); in the white point, the saturation is zero, per definition.

It is noted that many visible colors can be obtained by mixing two colors, but this does not apply for all colors, as can easily be seen from FIG. 2. Further, in practice lamps may not produce ideal colors. In a system comprising three lamps producing three different colors having corresponding color points C1, C2, C3 in FIG. 2, it is possible to produce light having any desired color within the triangle defined by these three color points C1, C2, C3. More lamps may be used, but that is not necessary. For instance, it is also possible to add a white light lamp. Or, if it is desired to produce a color outside said triangle, a fourth lamp having a color point closer to the desired color may be added. Inside said triangle, colors are in such case no longer obtained as a unique combination of three light outputs but can be obtained in several different ways as combination of four light outputs.

It is noted that the two-dimensional representation of FIG. 2 corresponds to all colors having the same brightness Y. For different brightnesses, the shape of the lines 1 and 2 may be different. The brightness may be taken as a third axis perpendicular at the plane of drawing of FIG. 2. All two-dimensional curves together, stacked according to brightness, define a curved three-dimensional body. In other words, the chromaticity diagram of FIG. 2 is a two-dimensional cross-section of the three-dimensional color space. It is further noted that color representation in a two-dimensional plane may be transformed to another shape, for instance a circular shape or wheel shape (color wheel).

From the above, it should be clear that, once the controller 15 has defined a target color point in a color space, it is possible for the controller 15 to generate its control signals ξ1, ξ2, ξ3 such that the overall output light 17, i.e. the mixture of individual lights 16A, 16B, 16C, has the desired target color.

It is possible that the controller 15 is capable of receiving a user input signal, defining a target color point. To that end, the controller 15 may be provided with a user interface (not shown). In an example, a suitable user interface may comprise three separate input device, such as potentiometers, for defining R-, G- and B-values between 0 and 1. In another example, a suitable user interface may comprise a rotary potentiometer for defining a hue angle in a color wheel representation and a linear potentiometer for defining saturation. In another example, a suitable user interface may comprise a graphical display allowing a user to indicate a point in a two-dimensional color space. In all these examples, the user would be able to directly control the color of the output light 17.

In practice, it is desirable for a user to be able to set the color of the output light such that the color of the output light matches the surroundings, or matches the color of a specific object. In the above example, this would require the user to generate a user input signal directly defining the target color. However, in practice this appears to be difficult for untrained users, so users tend to follow a tedious process of trial and error.

In order to avoid this problem, the system 10 allows the user to input to the controller 15 information defining the color of the surroundings or the color of a specific object, which will hereinafter be indicated as the “source color”. It is possible that the system comprises for this purpose a user interface of the type described above. Preferably, however, the system 10 is capable of working user-independently and comprises at least one color sensor 20, capable of sensing light and generating a measurement signal Sm indicating the color point of the sensed light. Since color sensors are known per se, it is not necessary to explain their operation in great detail. In an example, such color sensor may comprise a set of light detectors each sensitive to light within a relatively small wavelength region (for instance R, G, B), or broadband light detectors receiving light through suitable filters. It is also possible that a color sensor comprises one or more light sources and detects reflected light.

The color sensor 20 may be integrated with the controller 15, or may be a separate handheld device, coupled to the controller through wired or wireless connection. It is also possible that the color sensor 20 is integrated in a housing of the luminaire.

In practice, the user will take the color sensor 20 to sense the color of the surroundings, or of the key object to which he wishes the output light 17 to match. Or, in case of a luminaire with integrated color sensor, the luminaire adapts automatically to its surroundings as far as the surroundings are influencing the light received at the sensor.

The system 10 further comprises a memory 30, containing information defining color harmony rules. These rules basically define a target color as a function of a source color. These rules may for instance be in the form of a lookup table, or in the form of a formula. The harmony rules are predefined by the manufacturer of the system 10.

Different types of harmony rules are possible. For instance, based on a color wheel as representation of the color space, a harmony rule may calculate the target color as complementary to the source color (for instance yellow versus purple-blue). In another example, a harmony rule may define three or four equidistant colors on the color wheel as being in harmony with each other, so a target color may be calculated as having a certain angular distance (corresponding to hue distance) to the source color.

It is noted that harmony rules are known per se, as will be known to persons skilled in this art. By way of example, reference is made to the website http://www.sessions.edu/career_center/design_tools/color_calculator/index.asp# where an interactive color calculator is available, in accordance with different, selectable harmony rules.

It is further noted that it will be clear to a person skilled in the art how a certain harmony rule is to be implemented in a lookup table or a formula.

The memory 30 may contain harmony rules according to one type only. However, it is also possible that the memory 30 contains multiple harmony rules according to multiple harmony types, and the controller 15 may be provided with a user input 19 allowing the user to select one harmony type. The user input 19 provides to the controller 15 a rule selection signal Srs, and the controller 15 uses this rule selection signal Srs to select one color harmony rule from among the rules in the memory.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, it is possible that the system comprises multiple color sensors, and that the user is allowed to select one of the sensors as operative sensor, or that the controller is designed to calculate a source color as an average of the measured colors.

Further, the invention has been described in terms of R, G, B values. Other color spaces or color representations, however, are also possible. Further, it is noted that RGB values inherently define a brightness, i.e. light intensity. However, the user should be able to find a matching color irrespective of the brightness of the color of the surroundings, and he should be able to freely set the brightness of the controllable lamps 12. Although it is possible to combine these features with sensing and calculating in the RGB space (by multiplying all values by the same amount), it is preferred to calculate in brightness-independent representations, for instance in terms of hue and saturation. In the case of an RGB-sensor, the controller may first transform the RGB measurement signal to a Hue, Saturation, Brightness signal and process the Hue and Saturation values only.

Further, the invention has been described for an embodiment where the harmony rules yield one harmonious target color as a function of the input source color. However, it is also possible that a harmony rule yields two or three or even more harmonious target colors as a function of the input source color. In a case where the system only comprises one controllable lamp assembly, or in a case where it is desirable that multiple controllable lamp assemblies are all producing the same color, one target color should be selected from among the two or more possible harmonious target colors. This preferably should be a user-selection. Now a difficulty is how to allow the user to communicate his choice to the controller. In a simple and elegant solution, the controller is programmed to sequentially drive the lamp assembly with control signals resulting in the different possible target colors, so that the user can see these colors and make a choice, which he can simply input to the controller by pressing an OK-button (not shown) during a time interval when the controller is showing the selected color.

In a case where the system comprises multiple controllable lamp assemblies, the above is possible for each lamp, but it is also possible that the different lamps are driven for different target colors. Here, the decision which color is produced by which lamp may be a decision made by the controller, but it may also be a user-decision.

Summarizing, the present invention provides an illumination system 10 comprising:

- a lamp assembly 14 for generating color-variable light 17;
- a controller 15 for generating control signals ξ1, ξ2, ξ3 for the lamp assembly;
- source color input means 20, preferably a color sensor, for inputting to the controller information defining a source color;
- a memory 30 associated with the controller, containing information defining at least one color harmony rule.

On the basis of the input source color, and using the harmony rule from the memory, the controller calculates a target color and generates its output control signals accordingly. Thus, the light output from the lamp assembly harmoniously matches the measured color of surroundings or objects.

Other variations to the disclosed embodiments can be understood and effected by those skilled in the art in practicing the claimed invention, from a study of the drawings, the disclosure, and the appended claims. In the claims, the word “comprising” does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. An illumination system, comprising:

at least one color-rendering lamp assembly capable of generating color-variable light;

a controller for generating control signals for the lamp assembly;

source color input means for inputting to the controller information defining a source color a memory associated with the controller, the memory containing information defining at least one color harmony rule;

wherein the controller is designed to calculate its output control signals such as to define at least one target color as a function of the source color using the harmony rule from the memory, the target color being distinct from the source color and harmonious with the source color;

wherein the source color input means comprises a color sensor capable of measuring the color of received light influenced by one or more objects surrounding the color-rendering lamp assembly and generating a measurement signal (Sm) indicating the measured color;

wherein the controller is designed to calculate the output control signals independently of the brightness in a two-dimensional brightness-independent color space.

2. The system according to claim 1, wherein the lamp assembly comprises a plurality of lamps and associated lamp drivers, the lamp assembly being designed for producing a light mixture consisting of light output contributions of the individual lamps.

3. The system according to claim 1, wherein the memory contains information defining multiple color harmony rules;

wherein the system further comprises a user input device for inputting to the controller a rule selection signal indicating a user-selected harmony rule from among said multiple color harmony rules;

and wherein the controller is designed to calculate its output control signals such as to define the target color as a function of the source color using the user-selected harmony rule from the memory.

4. The system according to claim 1, wherein the color harmony rule yields two or more colors in harmony with the source color, and wherein the system has a user-input for allowing a user to select one of these harmonious colors as the target color.

5. The system according to claim 1, comprising multiple lamp assemblies, wherein the color harmony rule yields two or more colors in harmony with the source color, and wherein the controller is designed to calculate its output control signals for the different lamp assemblies such that the different harmonious colors are rendered by the different lamp assemblies.

6. The system according to claim 5, wherein the system has a user-input for allowing a user to define which lamp assembly renders which color.

7. An illumination system, comprising:

a user input device in communication with a controller, said user input device providing a rule selection signal to said controller;

a color sensor in communication with said controller, the color sensor providing a color measurement signal to said controller;

wherein the controller is operably connected to a memory, the memory having instructions thereon for at least one color harmony rule;

said controller operably and electrically connected to a lamp assembly having a plurality of tamps;

said controller operable to calculate a plurality of output control signals which define a target color, said target color selected as a function of the color measurement signal using the color harmony rule in said memory;

said lamp assembly having a plurality of lamp drivers associated with each of said plurality of lamps;

said rule selection signal selecting said color harmony rule among said at least one color harmony rule in said memory;

said controller taking said color measurement signal and removing a brightness representation from said color measurement signal to generate a brightness-independent signal and calculating said target color on said brightness-independent signal based on the color harmony rule.

8. A method of providing a target color of illumination from a color-rendering lamp assembly, comprising:

receiving a color measurement signal from a color sensor, wherein the color sensor is near the color-rendering lamp assembly and the color measurement signal is influenced by one or more colors of one or more objects surrounding the color-rendering lamp assembly;

removing any brightness representation from said color measurement signal to generate a brightness-independent signal;

determining a source color based on the brightness-independent signal, the source color indicative of one or more of the colors of the one or more objects;

identifying a color harmony rule;

determining a target color as a function of the source color using the color harmony rule, wherein the calculated target color is distinct from the source color and harmonious with the source color;

determining a plurality of output control signals which define the target color; and providing the plurality of output control signals which define the target color to one or more lamp drivers of the color-rendering lamp assembly to provide the target color of illumination from the color-rendering lamp assembly.

9. The method of claim 8, further comprising receiving a rule selection signal from a user input device, wherein identifying the color harmony rule includes selecting the color harmony rule from a set of color harmony rules based on the rule selection signal.

* * * * *